March 14, 1967 H. F. DE HART 3,308,858
CARPENTER'S MITER BOX
Filed Sept. 29, 1964 5 Sheets-Sheet 1

INVENTOR.
Harold F. DeHart
BY
B. B. Olive
ATTORNEY

March 14, 1967     H. F. DE HART     3,308,858
CARPENTER'S MITER BOX
Filed Sept. 29, 1964     5 Sheets-Sheet 3
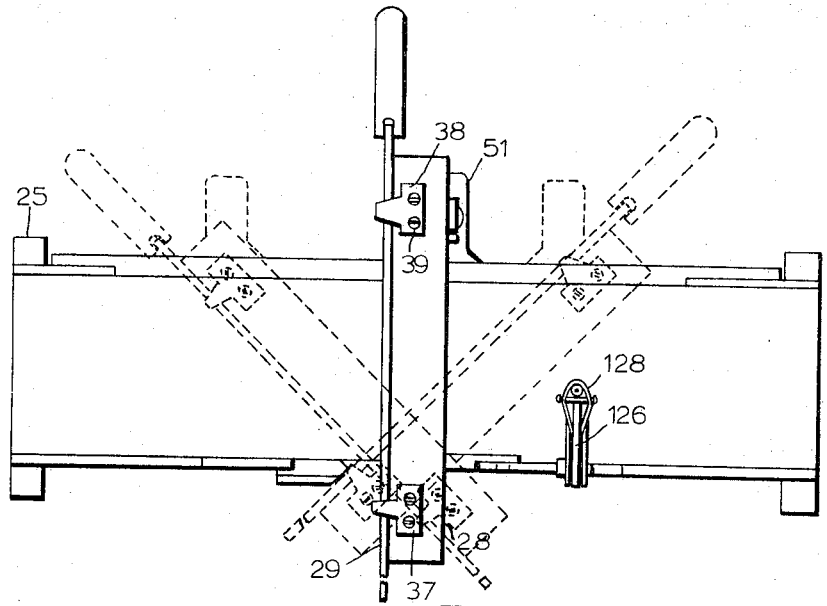
FIG. 5
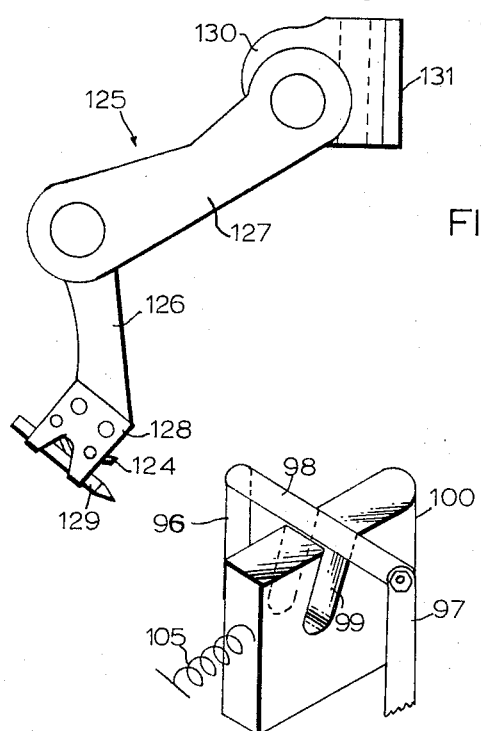
FIG. 15
FIG. 16
FIG. 9
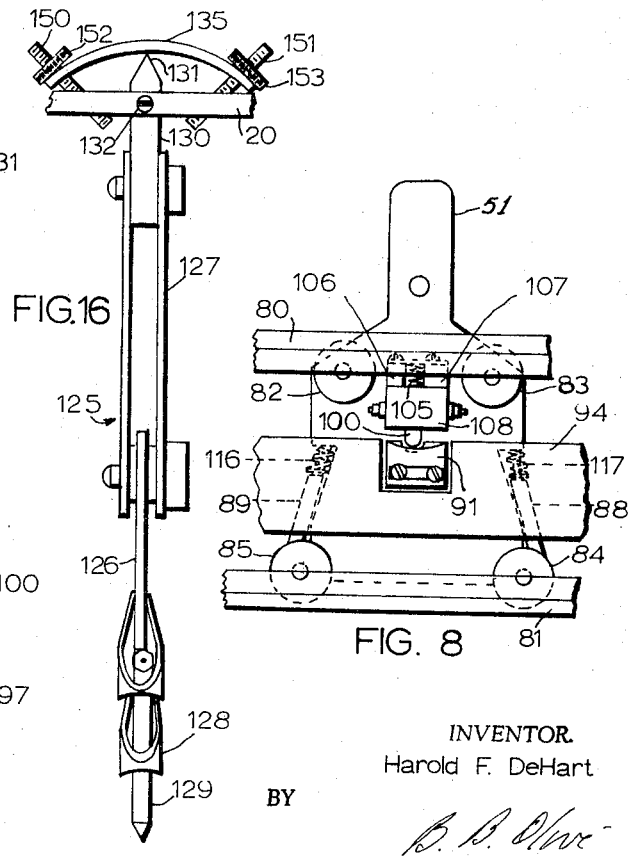
FIG. 8
INVENTOR.
Harold F. DeHart
BY
ATTORNEY March 14, 1967  H. F. DE HART  3,308,858
CARPENTER'S MITER BOX
Filed Sept. 29, 1964  5 Sheets-Sheet 4

INVENTOR.
Harold F. DeHart
BY
B. B. Olive
ATTORNEY

March 14, 1967     H. F. DE HART     3,308,858
CARPENTER'S MITER BOX
Filed Sept. 29, 1964     5 Sheets-Sheet 5
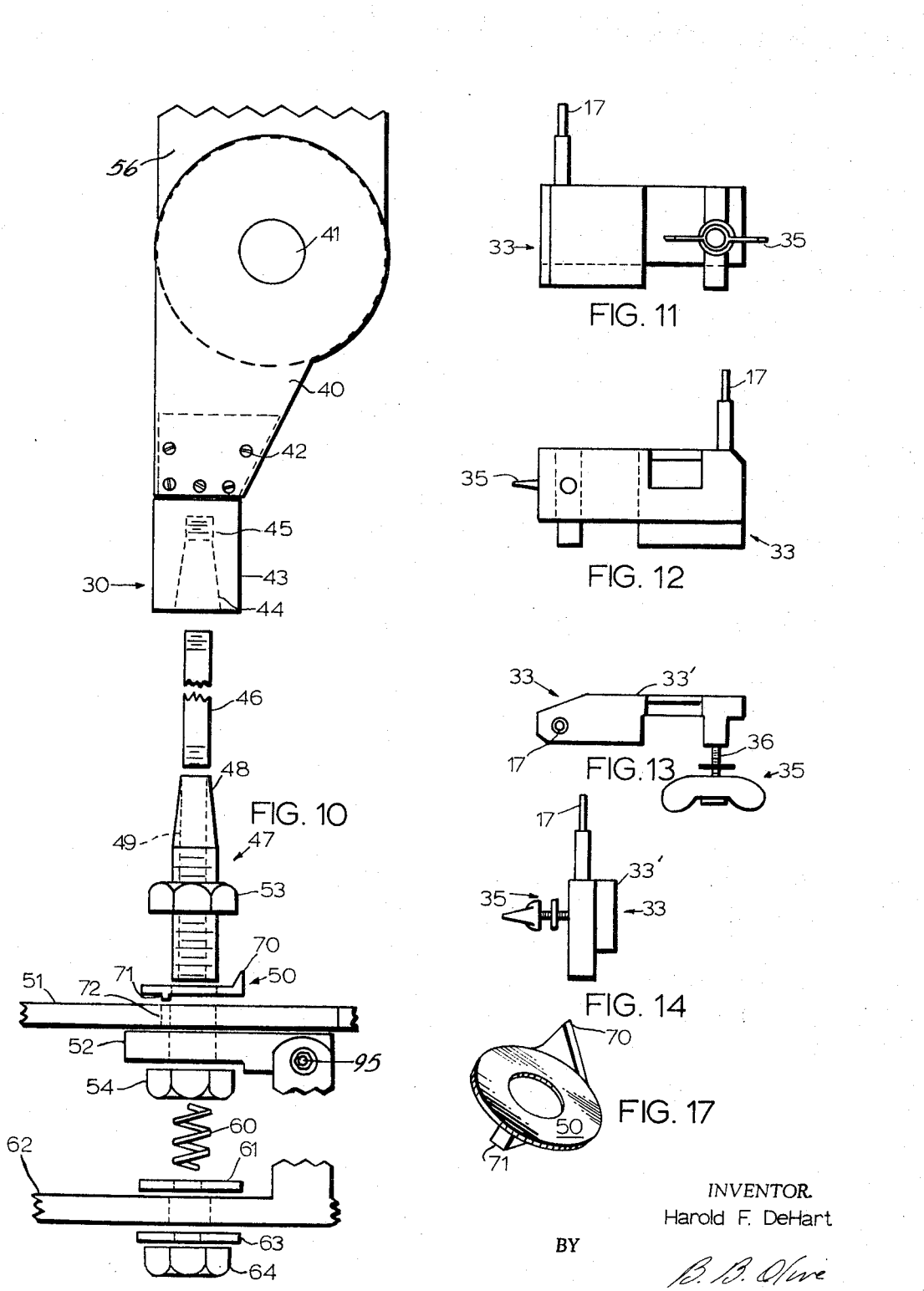
INVENTOR.
Harold F. DeHart
BY
B. B. Olive
ATTORNEY United States Patent Office 3,308,858
Patented Mar. 14, 1967

3,308,858
CARPENTER'S MITER BOX
Harold F. De Hart, 1116 Junction Road,
Durham, N.C. 27704
Filed Sept. 29, 1964, Ser. No. 400,272
3 Claims. (Cl. 143—89)

This invention relates generally to carpentry apparatus for marking and making angular cuts and more particularly to an improved miter box.

In the most popular form of miter box employed by carpenters the mitering saw is held in a saw guide which maintains the saw in accurate, angular alignment while allowing the saw to glide up and down as required. A saw guide is desired for accurate cuts in preference to simple hardwood open top boxes having slots as the only form of guide. When wood, such as molding, baseboard, furring strips and the like, is being placed beneath the mitering saw and saw guide arrangement before taking a miter cut, the mitering saw and guide must be lifted since they are interconnected and must be held in a lifted position and the wood slipped in from one side beneath the mitering saw. Furthermore, when a piece of wood which has been partially cut through, such as with a shallow slot, is to be removed, it must be slipped out endwise from beneath the guide and miter saw. Considerable time is thus lost in removing and placing wood beneath the mitering saw and saw guide in the conventional miter box. Another source of time loss arises in connection with making marks for coping joints. Normally, coping joints are not marked or given a coping cut while the wood is in a miter box even though it is frequently desirable to at least put coping joint marks on wood that has been cut for a miter joint even though coping joints are cut out with a coping saw away from the miter box. In any event, it is known that various makeshift arrangements have been employed for making coping joints marks and that miter box constructions have generally provided no means for making coping marks.

A general object of the present invention is, therefore, to provide an improved carpenter's miter box.

A more particular object of the present invention is to provide a carpenter's miter box having provision for easy removal of the mitering saw and pivoting of the saw guide such that wood can be inserted and removed vertically.

Another object of the invention is to provide a carpenter's miter box having an improved saw guide and saw guide mounting apparatus to facilitate angular positioning of the mitering saw guide.

A further object of the invention is to provide a carpenter's miter box having provision on the miter box itself for making coping joint marks.

Other objects and details of construction will become apparent from the description to follow and in the drawings in which like numerals refer to like parts, and in which:

FIGURE 5 is a plan view of the miter box with the saw and saw guide shown in all three main positions.

FIGURE 8 is a partial plan view of the saw guide carriage engaged with the carriage track and the saw guide angular locking device taken generally along line 8—8 of FIGURE 2, the view being rotated 90° counter-clockwise.

FIGURE 9 is a perspective view of a detent locking mechanism employed in the saw guide locking mechanism.

FIGURE 10 is an exploded view of a post arrangement employed with the saw guide.

FIGURE 11 is a rear elevation view of an adjustable wood clamping and saw guide support member.

FIGURE 12 is a front elevation view of the adjustable wood clamping-guide support member.

FIGURE 13 is a plan view of the adjustable wood clamping-guide support member.

FIGURE 14 is a right end view of the adjustable wood clamping-guide support member.

FIGURE 15 is a side elevation view of a coping joint marking apparatus employed in the invention and which is shown detached from the miter box.

FIGURE 16 is a plan view of the coping joint marking apparatus.

FIGURE 17 is a perspective view of an index washer employed in the invention.

Figures 1, 2:
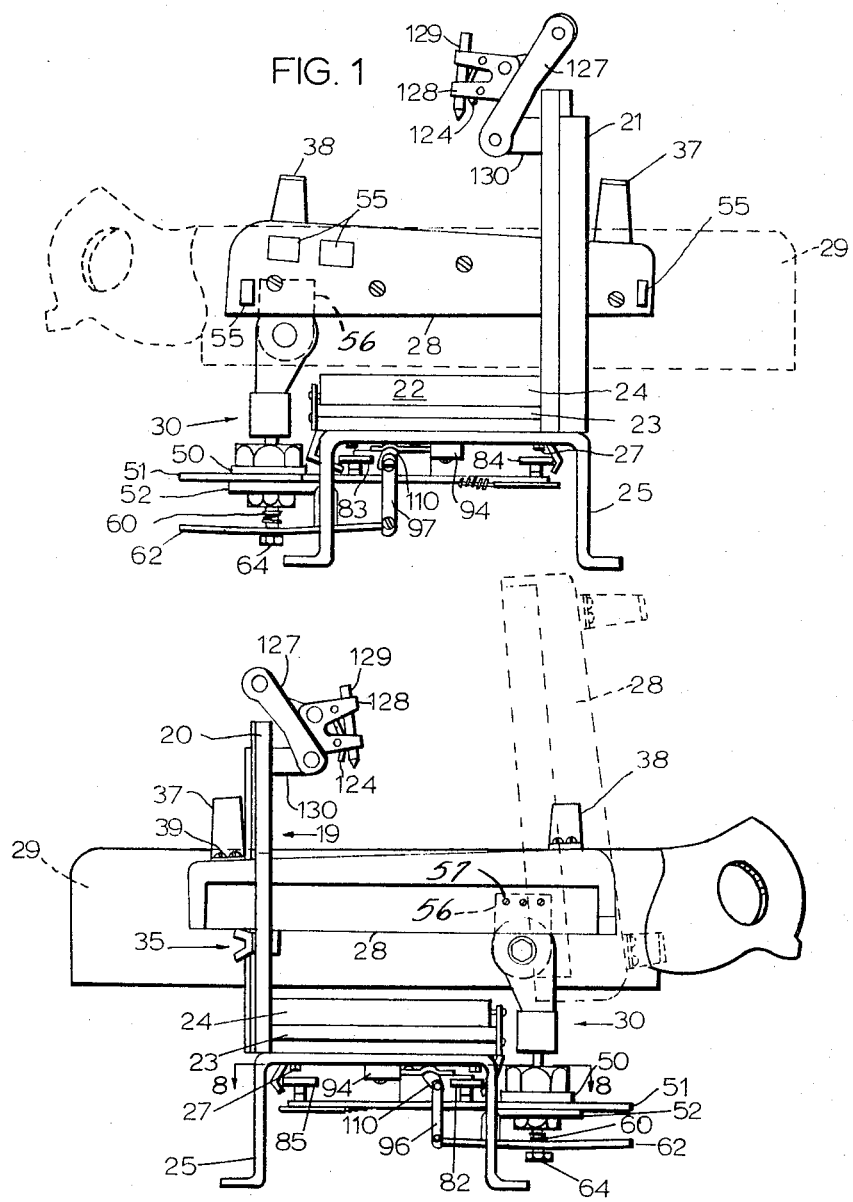
FIGURE 1 is a right end view of the improved carpenter's miter box with the saw dashed in its middle position.
FIGURE 2 is a left end view with the saw dashed in its middle position and also the saw guide dashed in a raised postion.

The invention follows established art in providing a miter box having a typical working base secured to a centrally slotted vertical backing member. The miter box of the invention also follows established art e.g. Patent 3,028,888 in utilizing magnetic means to hold the saw against the saw guide and in having the saw guide positionable to various angles of cut. The claim to invention is directed to a combination of these with other new features. In particular, the invention provides a miter box in which the saw can be released from the saw guide and the saw guide is tiltable vertically so that the wood can be placed and removed vertically without interference from the saw or guide. More especially, the miter box of the invention provides a movable carriage below the base which carriage travels on rails and mounts a post pivotally supporting one end of the saw guide. The saw guide is quickly adjusted for the angle cut desired by moving the carriage to a corresponding position. On the vertical backing member there is located an adjustable clamping device which acts as an adjustable clamp for clamping the wood to the base prior to cutting and also serves as a means for supporting the free end of the saw guide and regulating its height. As a final feature of the invention, there is provided a multi-positionable marking device supported by the backing member for making coping joint marks on the wood while retained in the box. All of these various features are now discussed in detail.

The carpenter's miter box releated to this invention comprises a backing member 19 secured to a base 22 illustrated as having a bottom portion of metal 23 and a top portion of wood 24. The top portion 24 being of wood protects the saw blade at the bottom of cuts and is arranged such that it can be removed whenever necessary for replacement. The base 22 is preferably rectangular in structure and is illustrated as such. The miter box is supported upon legs 25 which are fastened to the base by means of screws 27 or welds.

The backing member is in two parts 20, 21 which provide a vertical passage 18 mating with a saw guide 28 holding a saw 29 such that saw 29 may be positioned with no obstructions. The body of saw guide 28 is preferably made from a material such as hardwood which will allow as little friction as possible between the saw 29 and the saw guide 28 as saw 29 is operated. The body of saw guide 28 is fitted with magnets 55 whose surfaces are flush with the surface of guide 28 and which serve the purpose of holding the saw 29 flush against the saw guide 28 face. Equally important to the invention, the magnets also facilitate release of the saw from the guide when wood is being inserted or removed from the miter box.

The saw guide 28 is pivotally supported by a vertical post structure 30, later described in detail, which is mounted near the front edge of the miter box on a carriage mechanism later referred to. The saw guide 28 pivots on both a vertical axis and a horizontal axis and is thus enabled to swing both vertically and horizontally. The vertical axis about which guide 28 rotates coincides with the vertical axis of the vertical post structure 30. Post structure 30 is movable laterally and may be locked at various positions by means of a locking mechanism later described. These positions correspond to angles of cut which are calibrated on a metal member 31 which extends across the front of the miter box.

Figure 4:
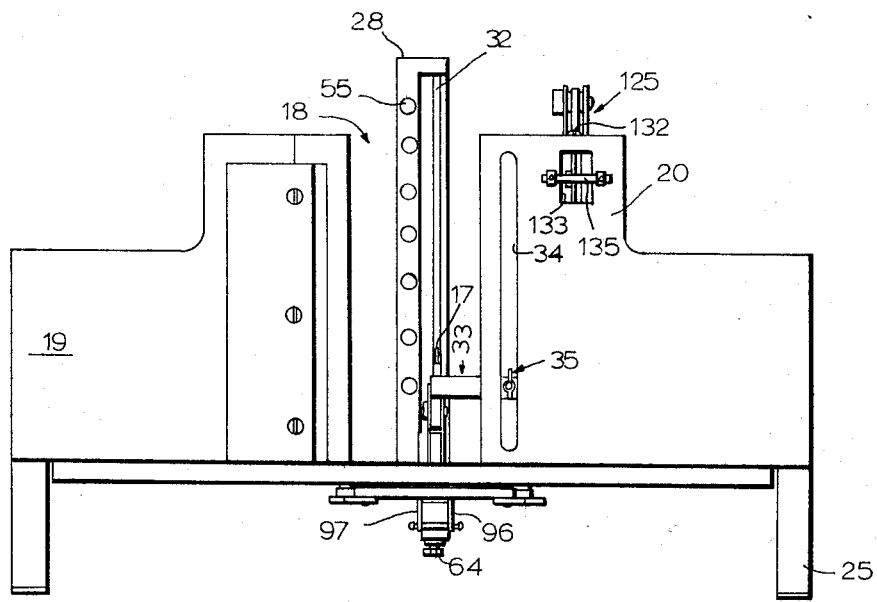
FIGURE 4 is a rear elevation view of the improved miter box with the saw guide in a vertical raised position.

The saw guide 28 is provided on its bottom surface with a slot 32 (FIGURE 4) that extends lengthwise of its base. A pin 17 that mates within the slot 32 is made integral with an adjustable support member 33. The support member 33 is slidably mounted upon the left backing member 20 by means of a slot 34 milled out of the backing member 20. A wingnut and washer set 35 mount on a threaded post 36 and act to hold the support member 33 in place when the wingnut is tightened. Support member 33 is adjustable in height and is arranged to support the free end of saw guide 28 so as to control its height above the wood being cut, not shown. The front extension 33' of support member 33 overlies the base 22 and provides a means for clamping the workpiece. That is, when support member 33 is adjusted for height, the workpiece can be placed under the extension 33' and clamped against base 22.

Saw guide 28 also has two bracket members 37, 38 fastened to its top by means of screws 39 which members serve the purposes of limiting the upward glide of saw 29 and of retaining the top edge of saw 29 against saw guide 28 so that in combination with the holding effect of magnets 55, saw 29 will stay in a vertical and flat position against the saw guide 28.

As previously stated, saw guide 28 is supported on the post structure 30 for pivotal swinging on both horizontal and vertical axis. Post structure 30 includes a top member 40 which has a mating plate member 56 mounted within arm 28 with a base portion whose radius is equal to that of member 40 through which passes a bolt 41 that provides a pivotal connection for guide 28. Plate 56 is secured in the portion of slot 32 adjacent post structure 30 by screws 57. That is, the axis of bolt 41 provides a horizontal swinging axis for guide 28. Member 40 is in turn integrally secured by screws 42 to a base member 43. Member 43 has an internal conical shaped hole 44 terminating in a tapped hole 45. A long cylindrical rod member 46 threaded at both ends, has one of its ends firmly secured in the tapped hole 45. Post structure 30 includes a further cylindrical member 47 having an upper conical surface 48 and a smooth bore 49 adapted to receive rod member 46 for free rotation therein. The external conical surface 49 mates with the internal conical surface 44. Member 47 in turn passes through an index washer 50, positioning arm 51, and a release arm 52. The assembly of member 47, washer 50, arm 51 and arm 52 is held together by two lock nuts 53, 54. As later seen from the description, arm 51 and 52 form part of the carriage mechanism previously referred to and act as support for the post structure 30 enabling post structure 30 to travel laterally along the front edge of the miter box.

Figure 3:
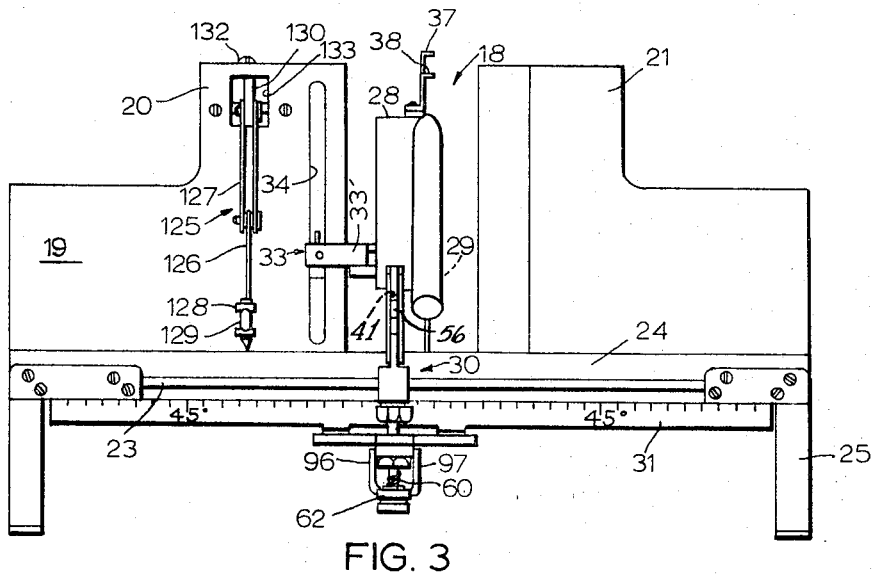
FIGURE 3 is a front elevation view of the miter box with the saw dashed.

Continuing the description of the post structure 30, rod member 46 passes through a spring 60, a washer 61, a position lock release lever 62 and a washer 63. A lock nut 64 mounted on rod member 46 serves to lock this last mentioned assembly together. As will be seen from later description, when lever 62 is pressed toward arm 51, the carriage mechanism, later described, is released for travel and the post structure 30 can be moved laterally essentially as an integral unit with the carriage mechanism. At the same time guide 28 can pivot around both the vertical axis of post structure 30 and the horizontal axis of bolt 41. To assist in locating the carriage position the pointed edge 70 (FIGURE 17) of the index washer 50 coincides with the axis of post structure 30 and can be matched with the index marks on member 31 (FIGURE 3). A downwardly turned protruding end 71 on washer 50 fits a slot 72 in arm 51 to assure that washer 50 will not turn.

A pair of rail tracks 80, 81 as best shown in a bottom view of the miter box (FIGURE 7), extend lengthwise of the box and slidably mounts a carriage mechanism. The carriage mechanism comprises a carriage body which mounts shaft members 65, 66, 67 and 68. Shafts 65, 66 also mount a pair of pivoted arms 86, 87. A pair of rods 117, 118, being fixedly mounted on the carriage body, have mounted thereon a pair of coil springs 115, 116 and a pair of hollow posts 88, 89. Posts 88, 89 reside against the notched portions 69, 70 of arms 86, 87 and thereby constantly force outwardly the arms 86, 87. The arms 86, 87 mount a pair of wheels 84, 85 and the carriage body also mounts wheels 82, 83. Carriage wheels 82, 83, 84, 85 reside in working relation with rail tracks 80, 81. As also best seen in FIGURE 7, pivoted arms 86, 87 maintain the respective carriage wheels against the respective tracks by virtue of the force of springs 115, 116.

Figure 6:
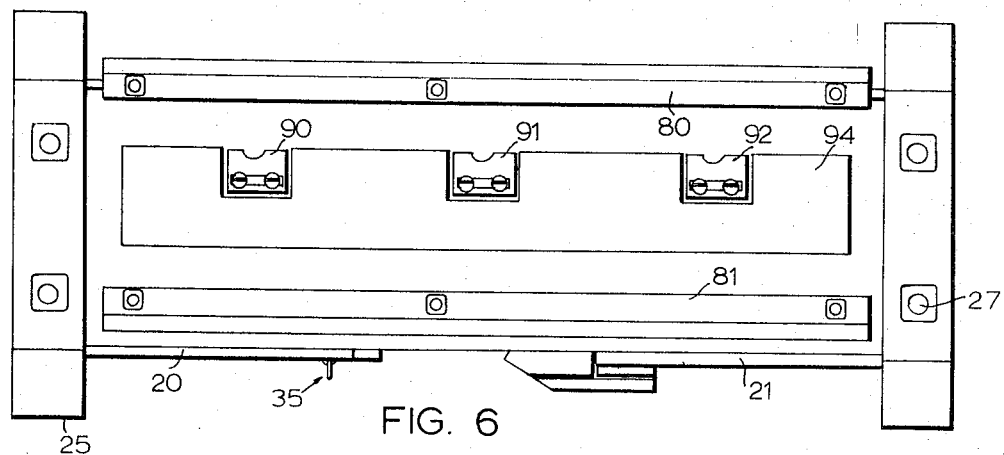
FIGURE 6 is a bottom view of the miter box with the saw guide carriage removed.

The carriage proper includes a detent mechanism operated by lever 62, the detent stops being provided by the adjustable notched detent plates 90, 91, 92 mounted on plate 94 shown in FIGURE 6. Each detent stop corresponds to a particular angle of cut and as many detent stops can be provided as desired. That is, the carriage is locked in different angular positions, by engaging and disengaging the detent mechanism.

Figure 7:
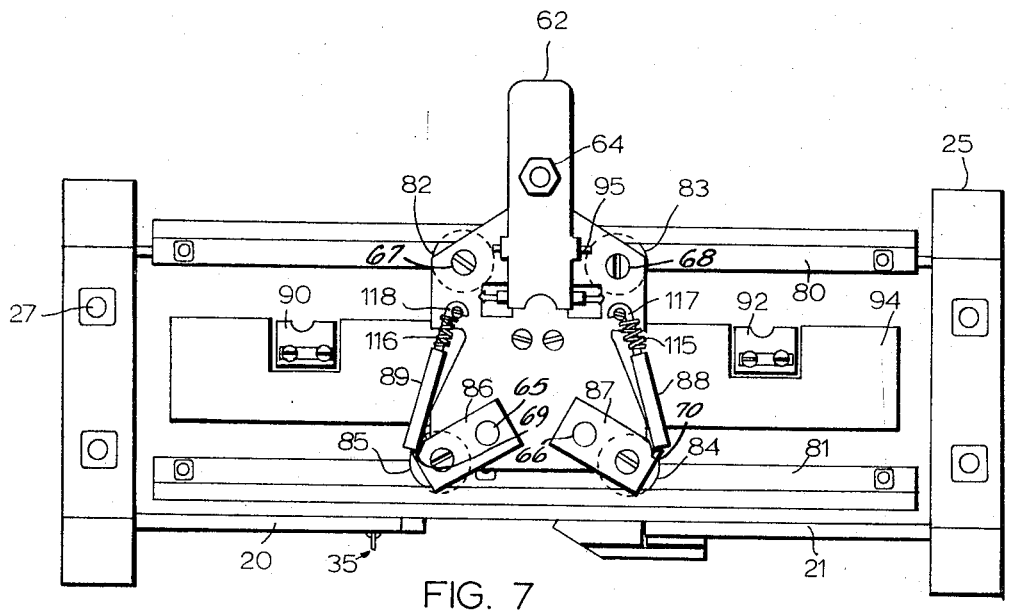
FIGURE 7 is a bottom view of the miter box with the saw guide carriage installed.

Considering the detent mechanism, lever 62 is held downward by force of spring 60 (FIGURE 10) and pivots on a rod 95 (FIGURE 7). A pair of link arms 96, 97 (shown in FIGURES 1, 2 and 9) connect to the end of lever 62 and a further horizontal actuating rod 98 connects between arms 96, 97 such that when lever 62 is moved up by finger press action, rod 98 is moved down. Rod 98 acts in a sloping slot 99 to move a detent arm 100 towards the front of the machine whenever lever 62 is raised. Arm 100 is normally held engaged with one of the detent plates 90, 91 or 92 (FIGURE 6) by means of a spring 105 indicated in FIGURE 9 and shown also in FIGURE 8. Arm 100 is guided in its movement by a detent housing which includes a pair of side pieces 106, 107 and a cover plate 108, the side pieces 106, 107 being slotted, as at 110, FIGURE 2, to accommodate the action of rod 98.

In cutting angular cuts it is desirable particularly to mark the full length of a coping joint cut. This is difficult where the wood has a complex curve surface such as found in molding. It is also sometimes desirable to mark a miter joint cut while the workpiece is in the miter box. For these purposes, the invention provides a marking device 125 comprising articulated arm members 126, 127 which support a marking holder 128 for a pencil 129 or the like and which is retained by a leaf spring 124. Pivotal swinging about a vertical axis is provided by a housing 130 having a vertical edged surface 131. Housing 130 mounts on a vertical post 132 fitted in a square slot 133 provided in backing member 20. In order to maintain marking device 125 at say forty-five degree angle a leaf spring 135 bears against surface 131 and causes device 125 to maintain its position. The slope of surface 131 is designed to insure that device 125 can be snap-locked into either a left forty-five degree or right forty-five degree position with fine adjustment being provided by the adjustable stop screws 150, 151 held by lock nuts 152, 153. Thus, the workpiece can be marked for either a miter joint cut or a coping joint cut while in position in the miter box.

Referring to the operation, the material, for example a piece of molding, rests on the bed 22 against the vertical wall plates 20, 21 and is clamped in position by means of the adjustable wood clamping and guide support member 33. Prior to being clamped, the material can be marked for the cut by means of the pencil marking device 125. After the material is clamped in position, the slot 32 in the bottom of saw guide 28 is engaged with pin 17 located on clamping and support member 33. The desired angle of cut is then set by operation of lever 62 and lateral traverse of the carriage. The saw 29 is then placed flat against the saw guide 28 and is held by the magnets 55. After the material has been sawed, the saw 29 can be released from the magnets, the saw guide 28 raised, and the clamping and support device 33 released from the material. The sawed product may then be lifted vertically from bed 22 with nothing to obstruct its path.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention claimed.

What is claimed is:

1. A miter box having a horizontal work support base; a saw; a vertical backing member secured to said base and including a centrally located vertical passage for receiving said saw when engaged with a workpiece supported on said base against said member; a carriage device including a movable carriage and rail means located lengthwise of and beneath said base and on which said carriage travels; manually operable means for locking said carriage at predetermined positions corresponding to particular angles of cut; vertical post means supported on said carriage and movable therewith along the front edge of said base; a saw guide pivotally secured at one end to said post means in a manner allowing said guide to swing both vertically and horizontally; means releasably securing said saw to said guide; and a vertically adjustable support member mounted on said backing member adjacent said passage being arranged to adjustably support the free end of said guide adjacent said passage and having an extension overlying said base adapted to clamp said workpiece.

2. In a miter box as claimed in claim 1 wherein said means releasably securing said saw comprises magnetic holding means carried by said saw guide and effective to releasably secure said saw against said guide.

3. In a miter box as claimed in claim 1 wherein said saw guide includes a slot in its bottom surface, said support member mounts a vertical guide pin and said pin is arranged to engage said slot whereby to maintain said guide in alignment with said passage.

References Cited by the Examiner
UNITED STATES PATENTS

| | | | |
|---|---|---|---|
| 787,230 | 4/1905 | Stuebe | 143—89 |
| 997,221 | 7/1911 | Turnbull | 143—89 |
| 1,574,663 | 2/1926 | Leske | 143—89 |
| 2,828,545 | 4/1958 | Ely | 33—21 |
| 3,028,888 | 4/1962 | Chapin et al. | 143—89 |

DONALD R. SCHRAN, *Primary Examiner.*